United States Patent
Ito et al.

(10) Patent No.: US 6,662,059 B2
(45) Date of Patent: Dec. 9, 2003

(54) CHARACTERISTIC ADJUSTING METHOD IN PROCESS OF MANUFACTURING PRODUCTS

(75) Inventors: Yoshiharu Ito, Kuwana (JP); Yasuhiro Fukuhara, Inabe-gun (JP)

(73) Assignee: Denso Corporation, Kariya (JP)

( * ) Notice: Subject to any disclaimer, the term of this patent is extended or adjusted under 35 U.S.C. 154(b) by 54 days.

(21) Appl. No.: 10/102,975

(22) Filed: Mar. 22, 2002

(65) Prior Publication Data

US 2002/0143417 A1 Oct. 3, 2002

(30) Foreign Application Priority Data

Mar. 27, 2001 (JP) ........................................ 2001-089882

(51) Int. Cl.[7] .............................................. G06F 19/00
(52) U.S. Cl. .............................. 700/75; 700/31; 706/25
(58) Field of Search ............................. 700/28, 29, 31, 700/48, 50, 54, 95, 97, 108; 706/25, 20–21

(56) References Cited

U.S. PATENT DOCUMENTS

| | | | | |
|---|---|---|---|---|
| 5,692,107 A | * | 11/1997 | Simoudis et al. ............. | 706/12 |
| 6,347,310 B1 | * | 2/2002 | Passera ........................ | 706/25 |
| 6,363,289 B1 | * | 3/2002 | Keeler et al. ................. | 700/48 |
| 6,405,140 B1 | * | 6/2002 | Chen et al. .................... | 702/35 |
| 2003/0046253 A1 | * | 3/2003 | Shetty et al. .................. | 706/1 |
| 2003/0088565 A1 | * | 5/2003 | Walter eta l. .................. | 707/6 |

FOREIGN PATENT DOCUMENTS

| JP | A 5-204407 | 8/1993 |
|---|---|---|
| JP | A 10-187206 | 7/1998 |

* cited by examiner

*Primary Examiner*—Ramesh Patel
*Assistant Examiner*—Ronald D. Hartman, Jr.
(74) *Attorney, Agent, or Firm*—Oliff & Berridge, PLC

(57) ABSTRACT

In a process control data base, intermediate characteristics, processing condition for controlling a characteristic and a final characteristic in a process of manufacturing products are stored as a set of data for each product lot. In Process 1, a set of data for each product lot are prepared. Next, in Process 2, cluster processing is conducted on each set of data obtained in Process 1. In Process 3, using the set of data obtained in Process 2, the intermediate characteristics and the processing condition for controlling a characteristic are inputted and the final characteristic is outputted, and a causal relation between the input and output is quantified by a neural network so as to make a learning model. In a model applying stage, the most appropriate processing condition for controlling a characteristic is retrieved by using the learning model and the intermediate characteristics in the previous steps.

8 Claims, 5 Drawing Sheets

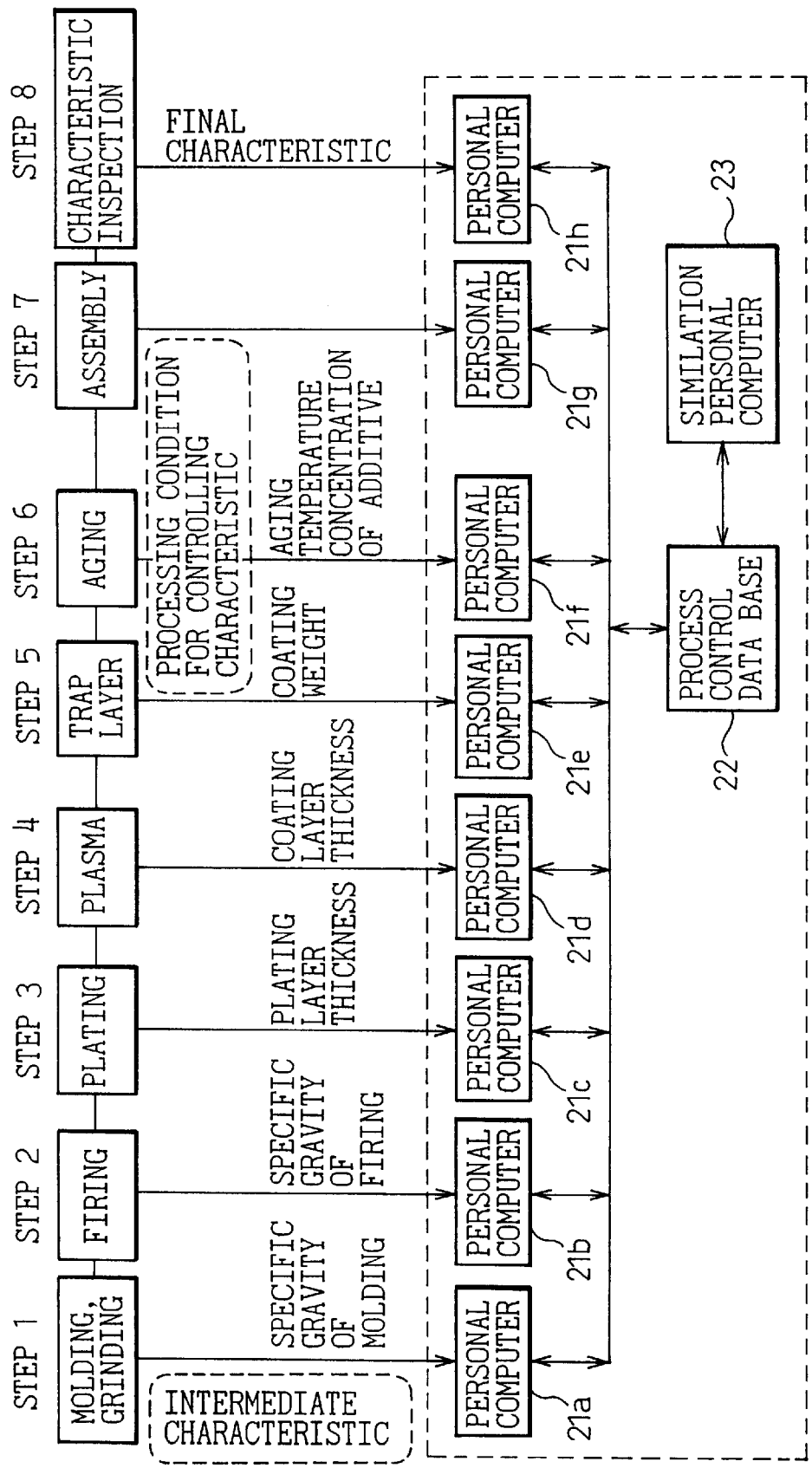

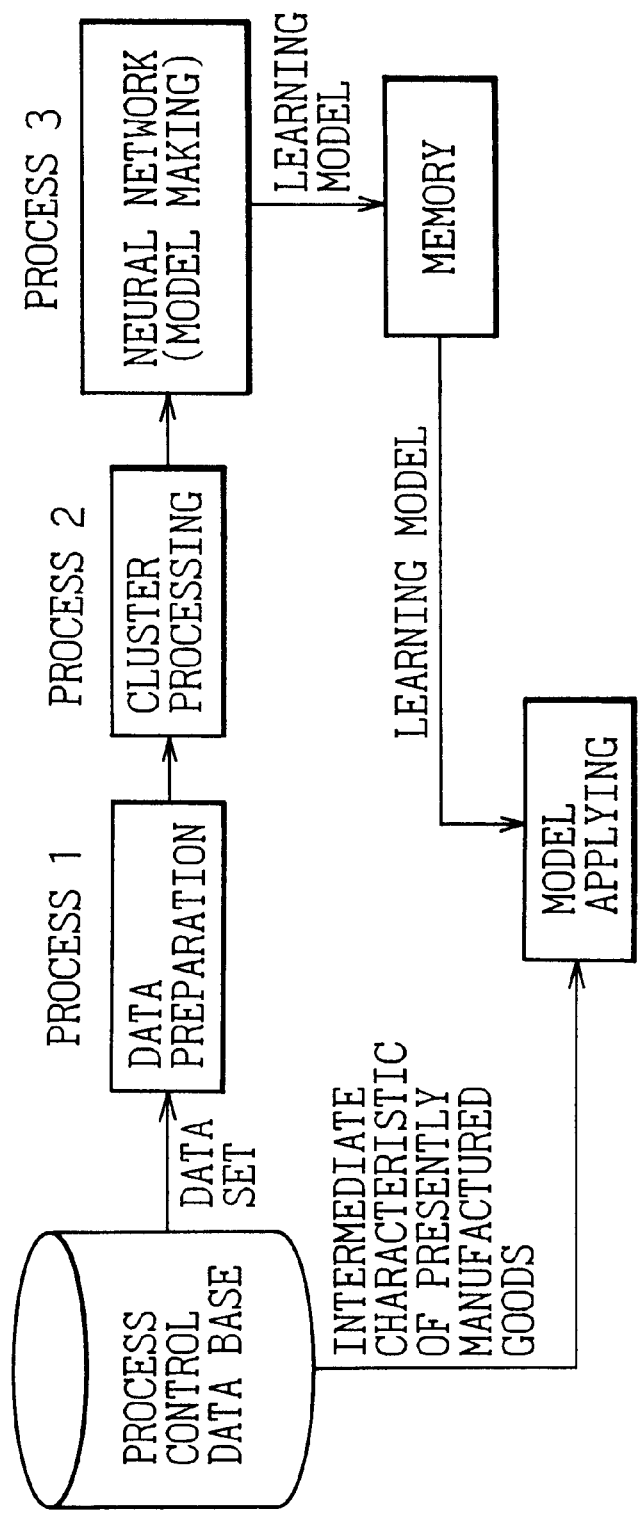

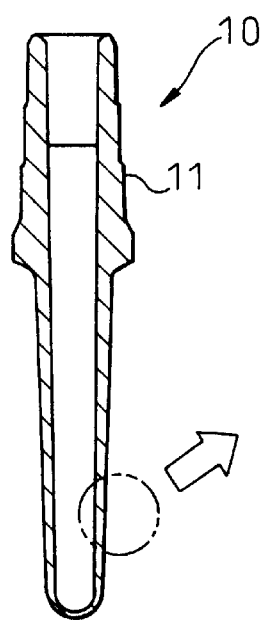
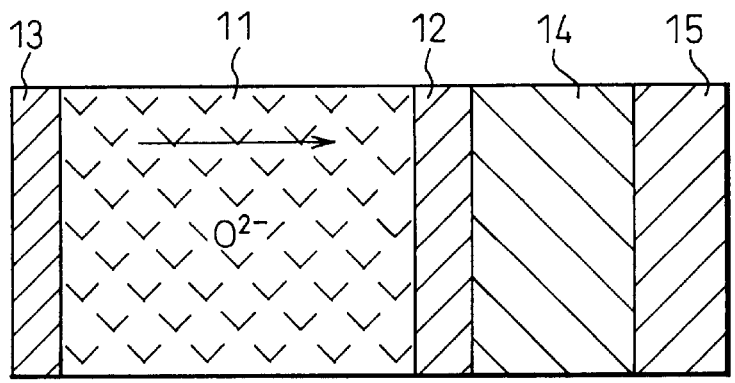
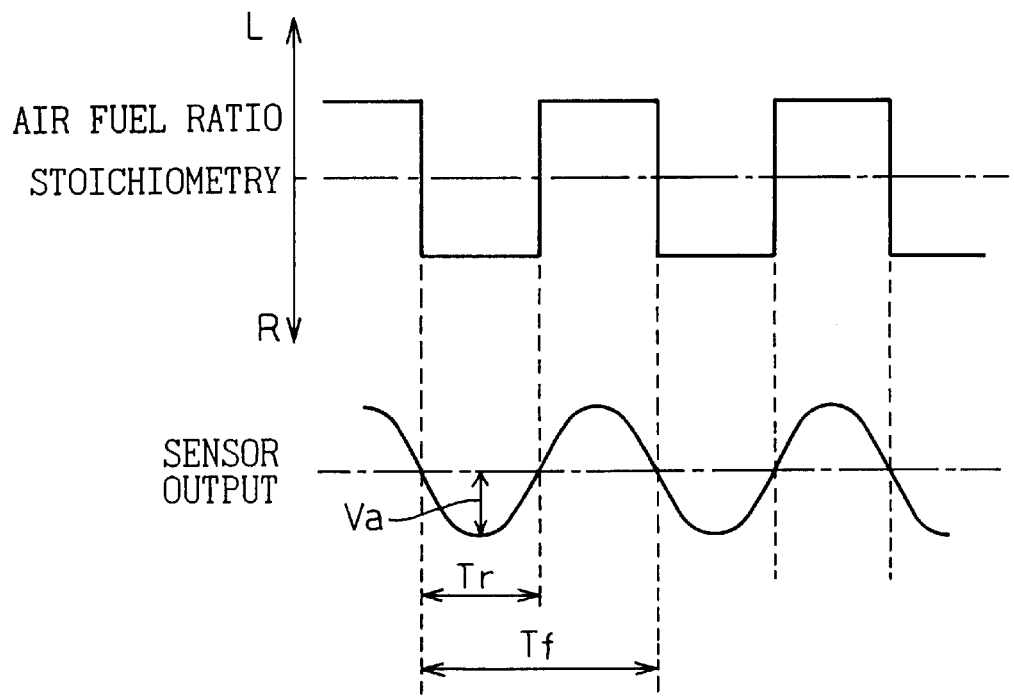

CHARACTERISTIC ADJUSTING METHOD IN PROCESS OF MANUFACTURING PRODUCTS

BACKGROUND OF THE INVENTION

1. Field of the Invention

The present invention relates to a characteristic adjusting method in a process of manufacturing products.

2. Description of the Related Art

A large number of steps are incorporated into a process of manufacturing products, and a step of adjusting a characteristic is provided in the process of manufacturing products. When a processing condition for controlling a characteristic of products is imparted into the step of adjusting a characteristic thereof, the characteristic can be often incorporated into the products when the products are finished. For example, in the manufacturing process shown in FIG. 6, after steps 1 to n−1 have been successively executed, the processing condition for controlling a characteristic is imparted into step n which is a step for adjusting a characteristic. Further, after step n+1 etc. have been successively executed, the characteristic of the finished product is inspected. For example, in the case of ceramic products, heat treatment corresponds to the process for adjusting a characteristic, and the heat treatment condition in the step of heat treatment corresponds to the processing condition for controlling a characteristic. In this case, the resultant characteristic obtained in characteristic inspection is fed back to the characteristic adjusting step, so that the processing condition for controlling a characteristic is changed in the step and the resultant characteristic in the characteristic inspection is made to agree with a target value.

However, according to the above method, following problems may be encountered. The resultant product characteristic that does not agree with a target value is confirmed in a final characteristic inspection step, and a correcting action is started after the confirmation in the final characteristic inspection step. When a lead time exists between the characteristic adjusting step (step n) and the characteristic inspection step, all products, which have been produced in a time period corresponding to the lead time, do not agree with the target value.

On the other hand, and different from the above method in which a resultant characteristic obtained in a characteristic inspection is fed back to the processing condition for controlling the characteristic, a method of predicting the product characteristic is disclosed in Japanese Unexamined Patent Publication Nos. 10-187206 and 5-204407. For example, according to the technique disclosed in Japanese Unexamined Patent Publication No. 10-187206, a process is predicted on the basis of a mathematical model (theoretical formula) simulating the process of manufacturing a product body to be processed. In this case, in order to enhance the prediction accuracy, an offset value is found so as to correct the mathematical model on the basis of actual processing result data, obtained in the past, which are grouped according to the type of the product body to be processed or according to the process condition. However, in the case of the above patent publication, the mathematical model (theoretical formula) is required for predicting the result of process. Therefore, unless the mathematical model is made with high accuracy, it is impossible to predict with high accuracy. Further, it can be considered that a mathematical model of a manufacturing process can not be made. This technique disclosed in the above patent publication cannot be applied to a manufacturing process, a mathematical model of which cannot be made.

According to the technique disclosed in Japanese Unexamined Patent Publication No. 5-204407, a quantity of state and a quantity of output are determined to be variables to express a state of the process, and sampling is conducted on the quantity of state and the quantity of output in a specific time period. Multiple regression analysis is conducted in the multiple regression analysis section by using sampling values from a point of time of each sampling to a point of time of a predetermined time period in the past, so that a coefficient of partial regression can be found. Then, when patterns of the coefficients of partial regression are classified by a neural network, the pattern of change in the output value of the process is predicted. However, according to the above method, the output characteristic itself of the process (system) is not predicted but only the pattern of a change is predicted. Therefore, it has been impossible to conduct a fine adjustment, that is, it is impossible to incorporate a desired characteristic into a final characteristic of the product.

SUMMARY OF THE INVENTION

The present invention has been accomplished to solve the above problems. It is an object of the present invention to provide a characteristic adjusting method in a process of manufacturing products so that a characteristic can be relatively easily incorporated into products and the accuracy of incorporation of a characteristic can be enhanced.

In the manufacturing process according to the present invention, a characteristic adjusting step for imparting a processing condition for controlling a characteristic is executed in a large number of steps, and a characteristic inspecting step is executed via at least an another step after the characteristic adjusting step. In the characteristic adjusting method of the present invention, when a general classification is made, the major steps consist of a data preparing stage, a model making stage and a model applying stage. In more detail, in the data preparing stage, a set of data, for each product lot, which includes: respective intermediate characteristics obtained in each step before the characteristic adjusting step; a processing condition for controlling the characteristic imparted in the characteristic adjusting step; and a product characteristic, in the characteristic inspecting step, obtained on the basis of the intermediate characteristics in respective steps and the processing condition for controlling the characteristic, is prepared. In the model making stage, a learning model, which expresses a causal relation when the intermediate characteristic and the processing condition for controlling the characteristic are inputted and the product characteristic is outputted, is made by using the sets of data prepared in the above stage. Further, in the model applying stage, in the characteristic adjusting step, the most appropriate processing condition for controlling the characteristic is retrieved from the intermediate characteristics obtained in the steps before the characteristic adjusting step by using the learning model made in the above stage. In the second aspect of the present invention, in this model applying stage, on the assumption of the intermediate characteristics obtained in the steps before the characteristic adjusting step, product characteristics are predicted by changing the processing condition for controlling the characteristic and a processing condition for controlling a characteristic, which is predicted to create small error in a product characteristic, is retrieved.

After all, the intermediate characteristics and the processing condition for controlling the characteristic are important factors to determine the product characteristic. Therefore, when the learning model is made from the causal relation of the intermediate characteristics and the processing condition for controlling the characteristic with the product characteristic in the characteristic inspection step, as described above and, further, when the learning model is applied to the process after that, the product characteristic, in each product manufacturing, with respect to the intermediate characteristics and the processing condition for controlling the characteristic, in each product manufacturing, can be precisely predicted. In other words, in the characteristic adjusting step, the processing condition for controlling the characteristic to obtain a desired product characteristic can be automatically and appropriately retrieved from the intermediate characteristics (the processing result of products) obtained in the step before the characteristic adjusting step. In this case, different from the method disclosed in the above patent publication, incorporation of the product characteristic into products can be easily realized without using a mathematical model (theoretical formula). As the characteristic can be predicted in anticipation of the final product characteristic, incorporation of the product characteristic can be conducted with high accuracy.

According to the conventional method in which the inspection result obtained in the characteristic inspecting step is fed back to the characteristic adjusting step each time, other steps are provided between the characteristic adjusting step and the characteristic inspecting step. Therefore, a time delay is necessarily caused when the characteristic is incorporated into the product. However, according to the present invention, the product characteristic is predicted by the learning model. Therefore, incorporation of the characteristic into the product can be executed without causing a time delay.

In this specification, the processing condition for controlling the characteristic to be imparted in the characteristic adjusting step is defined as a processing condition which affects the final product characteristic. A typical processing condition for controlling a characteristic is a condition of heat treatment conducted on ceramic products etc. In a series of manufacturing process, a step having a great influence on a product characteristic is recognized as a characteristic adjusting step.

In the third aspect of the present invention, each set of data are plotted in a multi-dimensional space by parameters of the intermediate characteristics and the processing condition for controlling a characteristic for each set of data prepared in the data preparing stage, each set of data are classified into a plurality of clusters and a new representative point is calculated from an average of data of the same cluster. A learning model is made by using the representative point, which has been calculated as described before, in the model making stage. In this case, it is possible to provide both the effect in which deviation of a data distribution is corrected and the effect in which noise is reduced by the averaging processing. As a result, the accuracy of approximation of the learning model can be enhanced. Accordingly, the prediction accuracy of the product characteristic can be enhanced. Further, the processing time for learning stage can be reduced by the data compression effect.

In the fourth aspect of the present invention, concretely as a specific cluster processing (classifying the data into clusters), a maximum distance between any two data of each set of data in the multi-dimensional space is calculated, and the cluster processing is preferably conducted in the range of X% of the maximum distance.

In the fifth aspect of the present invention, the model making stage is constructed by a neural network. In this case, when the causal relation is estimated by appropriately combining a large number of inputs and outputs, it is possible to obtain a learning model of high accuracy in a short period of time.

In the sixth aspect of the present invention, when a predetermined number of sets of data are accumulated in the usual manufacturing process, the learning model is renewed at the point of time in the data preparing stage and the model making stage. In the manufacturing process, a process state is changed for various factors. Accordingly, there is a possibility that the learning model made in the past has not been the most appropriate model. In this case, when the learning model is renewed, if necessary, even if the process state etc. are changed, the learning model can be optimized corresponding to the change.

In the seventh aspect of the present invention, when a new learning model is made, the newest learning model and the learning model which has already been adopted at least at the present time, are compared with each other, and the learning model, which is predicted to create smallest error in a product characteristic, is determined to be a learning model to be adopted hereinafter. Due to the foregoing, incorporation of the product characteristic can be more preferably executed.

In the eighth aspect of the present invention, the present invention can be preferably applied to a process of manufacturing a ceramic gas sensor. The ceramic gas sensor detects a specific component concentration in gas to be detected. Therefore, a solid electrolyte layer, an electrode layer and a protective layer of the sensor element are made in respective steps. After that, in the characteristic adjusting step, a heat treatment condition is set as a processing condition for controlling a characteristic. In the characteristic inspecting step, an output characteristic of the sensor element is inspected. In this manufacturing process of manufacturing the gas sensor, in the model applying stage, the heat treatment condition is changed on the assumption of the intermediate characteristics obtained in steps before the characteristic adjusting step, and the heat treatment condition to obtain a desired sensor output characteristic is retrieved. In this case, the sensor output characteristic is changed by the intermediate characteristics and the processing condition (heat treatment condition) for controlling a characteristic. However, according to the present invention described above, the sensor output characteristic can be always adjusted within the range of the standard. As a result, the manufacture of defective gas sensors can be prevented, and the quality of the gas sensors can be improved.

The present invention may be more fully understood from the description of the preferred embodiments of the invention set forth below, together with the accompanying drawings.

BRIEF DESCRIPTION OF THE DRAWINGS

In the drawings:

FIG. 1 is a block diagram showing an outline of a sensor element manufacturing process and also showing an overall arrangement of a production control system;

FIG. 2 is a block diagram showing a procedure of incorporating a product characteristic into a product;

FIG. 4A is a sectional view showing a construction of a sensor element;

FIG. 4B is an enlarged view of part of a sensor element shown in FIG. 4A;

FIG. 5 is a time chart showing transition of a sensor output in the case of inspecting a characteristic with respect to time.

DESCRIPTION OF THE PREFERRED EMBODIMENTS

Figure 3A:
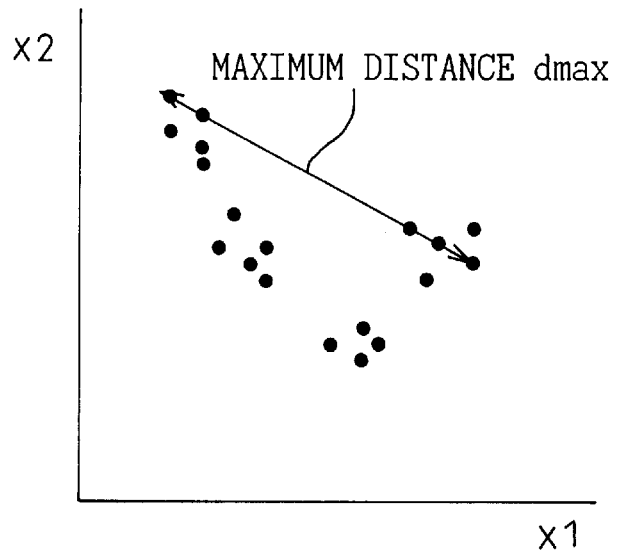
FIG. 3A is a schematic illustration for explaining a specific example of cluster processing.

Referring to the accompanying drawings, an embodiment of the present invention will be explained as follows. In this embodiment, an oxygen concentration electromotive force type oxygen sensor ($O_2$ sensor) is used as a specific example of a ceramic gas sensor, and the present invention is applied to its manufacturing process. First of all, an outline of the $O_2$ sensor and its manufacturing process will be briefly explained below.

FIG. 4 is a sectional view showing the construction of a sensor element of the $O_2$ sensor. FIG. 4A is a view showing an overall construction of the sensor element, and FIG. 4B is an enlarged view of its cross section. In the sensor element 10, a solid electrolyte layer 11, the cross section of which is a cup-shape, is made of an oxygen ion conductive oxide sintered body such as zirconia $ZrO_2$, and an exhaust gas side electrode layer 12 is provided on an outer surface of the solid electrolyte layer 11, and an atmosphere side electrode layer 13 is provided on an inner surface of the solid electrolyte layer 11. These electrodes 12, 13 are made of precious metal, the catalyst activity of which is high, such as platinum. Outside the exhaust gas side electrode layer 12, an electrode protective layer 14 made of alumina etc., and a trap layer 15 for catching poisoning materials, are provided.

Although not shown in the drawing, in the above sensor element 10, a housing and a connector terminal etc. are attached to a proximal end portion (an upper portion in the drawing) of the solid electrolyte layer 11, and a protective cover, the section of which is a C-shape, is attached to the top end side of the solid electrolyte layer 11. Further, a heater is attached into the inner space of the solid electrolyte layer 11.

Concerning the output characteristic of the $O_2$ sensor having the above sensor element 10, the $O_2$ sensor outputs a substantially binary voltage signal according to whether the air-fuel ratio of exhaust gas is rich or lean with respect to the theoretical air-fuel ratio ($\lambda=1$).

FIG. 1 shows a manufacturing process of the sensor element 10 and an overall arrangement of a production control system. First of all, the manufacturing process flow will be briefly explained below. In this connection, not all the manufacturing process of the sensor element 10 are expressed by the steps shown in the drawing. Only the main steps are shown in the drawing.

In FIG. 1, zirconia $ZrO_2$ is molded and ground into a shape, the cross section of which is a cup-shape, in step 1. Successively, in step 2, zirconia $ZrO_2$ is fired. In these steps 1 and 2, the solid electrolyte layer 11 is formed. After that, in step 3, the inner and outer surfaces of the solid electrolyte layer 11 are plated with platinum, so that the exhaust side electrode layer 12 and the atmosphere side electrode layer 13 are formed. Further, in step 4, the electrode protective layer 14 is formed by the plasma flame coating method etc. Successively, in step 5, a slurry for forming a trap layer is coated so as to form the trap layer 15.

After that, in step 6 which is a characteristic adjusting step, the sensor element 10 is aged at a predetermined heat treatment temperature in a predetermined atmosphere. In step 7, the housing, connector terminal and others are assembled to the sensor element 10. Finally, in step 8, the characteristic of the sensor element 10 is inspected.

As a production control system, personal computers $21a$ to $21h$ are provided in each step. Each step is controlled by each personal computer $21a$ to $21h$, and at the same time, the intermediate characteristics are successively received by each personal computer as information of each step. The personal computers $21a$ to $21h$ in each step compose a network, and data of the intermediate characteristics, the processing condition for controlling the characteristic and the final characteristic received by each personal computer $21a$ to $21h$ are sent to a process control data base 22, and the intermediate characteristics, the processing condition for controlling the characteristic and the final characteristic are stored and held as a set of data for each product lot.

Specifically, in step 1, the specific gravity of the molded solid electrolyte layer 11 is measured, and the thus measured data are received by the personal computer $21a$. In step 2, the specific gravity of the fired solid electrolyte layer 11 is measured, and the thus measured data are received by the personal computer $21b$. In step 3, the plating layer thickness of the electrode layers 12, 13 is measured, and the thus measured data are received by the personal computer $21c$. In step 4, the coating layer thickness of the electrode protective layer 14 is measured, and thus measured data are received by the personal computer $21d$. In step 5, the coating weight of the trap layer 15 is measured, and thus measured data are received by the personal computer $21e$. In the process control data base 22, the measurement data (intermediate characteristics) obtained in these steps 1 to 5 are stored and held for each product lot by spreadsheet software or the like.

In step 6 (characteristic adjusting step), the aging temperature and the additive concentration in the heat treatment furnace are determined as processing conditions for controlling a characteristic. These processing conditions for controlling the characteristic are sent from the personal computer $21f$ to the process control data base 22 and stored and held for each product lot in the same manner as that of the above intermediate characteristics.

In step 8 (characteristic inspecting step), the result of the characteristic inspection of the sensor element 10 is received by the personal computer $21h$ as the final characteristic and sent to the process control data base 22 and stored and held for each product lot in the same manner as that of the intermediate characteristics and the processing condition for controlling the characteristic described above. In this connection, in the inspection step as shown in FIG. 5, the atmosphere of gas to be detected is changed over between rich and lean with respect to the center of stoichiometry (theoretical air-fuel ratio) in a predetermined time period. From the output of the sensor element 10 at this time, the rich time ratio Dr, the output changing amplitude Va at the time of rich and a cycle time Tf are measured. In this connection, the rich time ratio Dr is a ratio (Dr=Tr/Tf) of time of the rich time Tr to a cycle time Tf. These measured data Dr, Va and Tf are received by the personal computer $21h$ as the final characteristic.

A simulation personal computer 23 is connected to the process control data base 22. Into this simulation personal computer 23, the intermediate characteristics and the process condition for controlling the characteristic are inputted by using a set of data for each product lot stored in the process control data base 22, so that the learning model, expressing a causal relation in the case when the final characteristic is made an output, is provided. At the same time, this simulation personal computer 23 applies the thus made learning model in the characteristic adjusting step, so that the final characteristic is incorporated into a product.

Next, referring to FIG. 2, a procedure of incorporation of the product characteristic, which is conducted by the simulation personal computer 23, will be explained in detail as follows. FIG. 2 is a block diagram showing a flow of processing. In this connection, the following explanations concern control mainly conducted by the simulation personal computer 23.

First of all, as "Process 1" (data preparing stage), a set of data (a set of batch processed data) for each product lot, which are stored and held in the process control data base 22, are prepared. In this case, the set of data are selected with reference to the standard of the intermediate characteristics provided for each product type (product number). That is, an upper limit and a lower limit of the intermediate characteristics data are previously determined. In the case where the intermediate characteristic data are out of the upper or the lower limit, a set of data including the intermediate characteristic data are erased or, alternatively, the intermediate characteristic data are substituted by the upper limit value or the lower limit value.

Next, as "Process 2", cluster processing is conducted on each set of data obtained in "Process 1" described above. That is, input data made of the intermediate characteristic and the processing condition for controlling the characteristic are used as parameters, and each set of data are plotted in a multi-dimensional space, and the input data, any two points of which have a distance less than a predetermined level, are classified to be the same cluster. An average of the input data of the same cluster is set to be a new representative point of input.

Figure 3B:
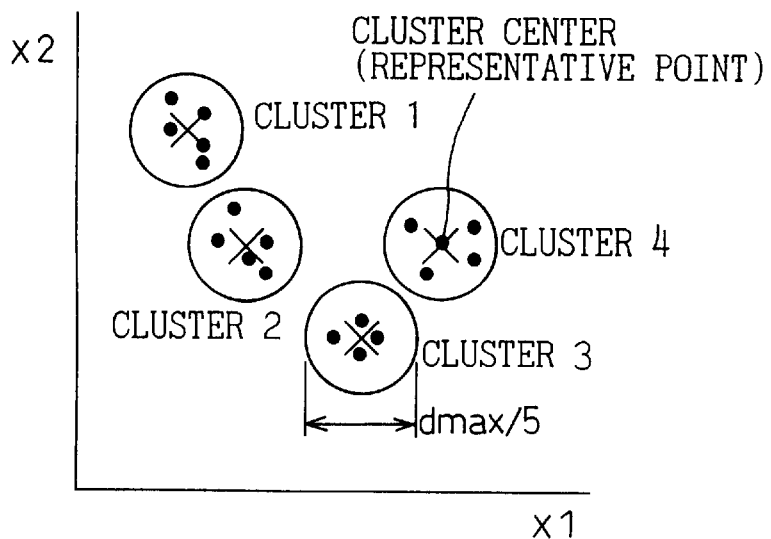
FIG. 3B is a schematic illustration for explaining a specific example of cluster processing.
Figure 3C:
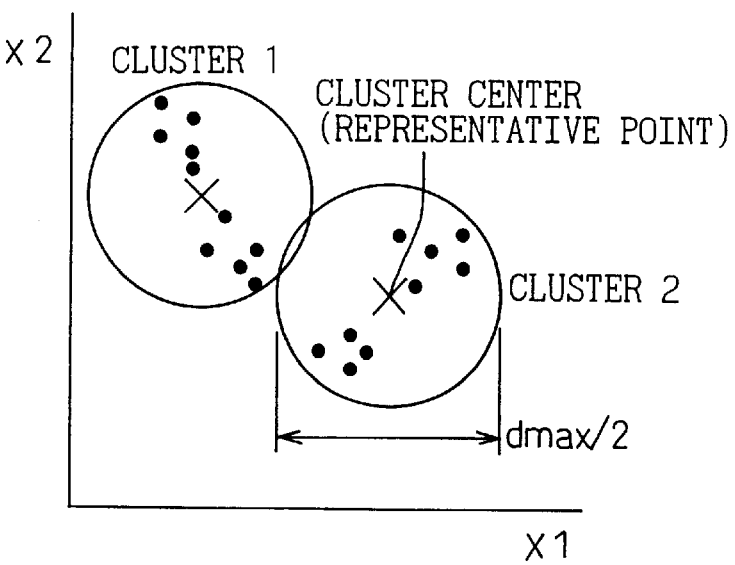
FIG. 3C is a schematic illustration for explaining a specific example of cluster processing.
Figure 6:
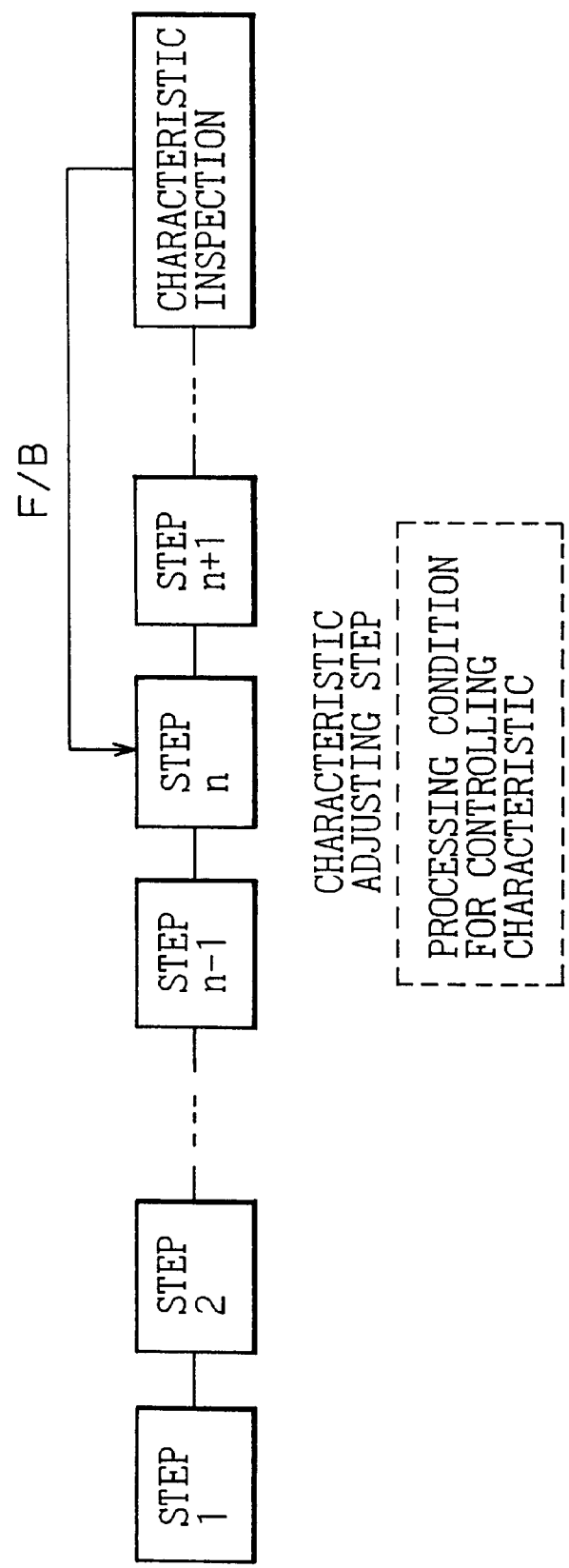
FIG. 6 is a block diagram showing a manufacturing process of the prior art.

The specific content of Process 2 will be explained referring to FIGS. 3A, B, C. In this connection, FIGS. 3A, B, C shows a case in which the input is two-dimensional (two inputs: x1, x2). Plotted input points corresponding to each set of data are distributed as shown in FIG. 3A in the two-dimensional coordinates. The maximum distance dmax between any two points of all the plotted input points is calculated. On the basis of this maximum distance dmax, plotted input points in the range of X% of the maximum distance dmax are recognized to be the same cluster. In the case where plotted input points in the range of 20% of the maximum distance dmax are recognized to be the same cluster, plotted input points are classified into the clusters 1 to 4 as shown in FIG. 3B, and each center point (representative point) is calculated with respect to the clusters 1 to 4. In the case where plotted input points in the range of 50% of the maximum distance dmax are recognized to be the same cluster, plotted input points are classified into the clusters 1 and 2 as shown in FIG. 3C, and each center point (representative point) is calculated with respect to the clusters 1 and 2.

Concerning the output (final characteristic) corresponding to the original input, in the same manner as that of input, an average of the same cluster is calculated and set to be a new representative point of output. The result of the above cluster processing is registered as a new set of data.

Further, as "Process 3" (model making stage), by using the set of data obtained in "Process 2" (cluster processing) described above, the intermediate characteristics and the processing condition for controlling the characteristic are inputted, and the final characteristic is used as an output and a causal relation between the input and output is quantified by the neural network so as to make a learning model. This learning model is stored in a predetermined memory region (hard disk) of the simulation personal computer 23.

In this case, the means for making a model is not limited to the neural network. It is possible to use an intellectual controlling method such as the fuzzy logic or GMDH (Group Method of Data Handling).

On the other hand, the thus made learning model is applied as follows (model applying stage). The simulation personal computer 23 takes in the intermediate characteristics, obtained in each step (steps 1 to 5), of a product, which is being newly manufactured and the manufacturing process of which advances to a step immediately before the characteristic adjusting step (step 5 in FIG. 1). In the characteristic adjusting step (step 6 in FIG. 1), by using the learning model which has been made as described above, and by studying a change in the final characteristics derived from changing the processing condition for controlling the characteristic, the most appropriate processing condition for controlling the characteristic is retrieved, so that the desirable final product characteristic (for example, the center of the standard) can be obtained. On the assumption of the intermediate characteristics obtained in the steps before the characteristic adjusting step, the final characteristics derived from changing the processing condition for controlling the characteristic is predicted, and the processing condition for controlling the characteristic, the prediction error of which is small, is retrieved.

The learning model is managed as follows and renewed when necessary. That is, the manufacturing process of the sensor element 10 is executed successively, and sets of data composed of the intermediate characteristics etc. are accumulated every moment. Even if the learning model is the most appropriate model at a certain point of time, it may not be the most appropriate model at the next point of time. The reason is that the state of a step is changed by various factors. Therefore, when the learning model is applied, it is necessary to adequately grasp a change in the circumstances and also it is necessary to renew and review the model parameters. A procedure of renewal of the model will be shown as follows.

When a predetermined number of sets of data are accumulated, a new learning model is made by the new sets of data at this point of time. In this case, for example, the number of sets of data to be used can be designated at an arbitrary number between 10 to 500 when it is counted from the latest number. When the new learning model, which has been made by the new set of data this time, and the present learning model, which is adopted at this point of time, are compared with each other, and the learning model, the predicted error of which is smaller, is determined to be a learning model to be adopted hereinafter.

In this connection, the learning models of several generations, which were made in the past, are stored in the hard disk so that they can be used as history, and a newly adopted learning model may be determined in comparing the new learning model with the past learning models. For example, the new learning model, which has been made this time, is compared with the learning models of the five past generations including the present learning model which is adopted at the present point of time, and the learning model, the predicted error of which is smallest, is determined to be a learning model to be adopted hereinafter.

According to the present embodiment described above in detail, the following effects can be provided.

In the characteristic adjusting step (steps 6 in FIG. 1), it is possible to predict the final characteristic of the product (sensor element 10) from the intermediate characteristics (the processing result of the product) in the previous steps, and also it is possible to automatically and appropriately retrieve the processing condition for controlling the characteristic so that a desired product characteristic can be provided. In this case, different from the conventional method disclosed in the patent publication of the prior art described before, incorporation of the product characteristic can be easily realized without using the mathematical model (theoretical formula). Since the final characteristic can be properly predicted, the characteristic can be incorporated with high accuracy. Even if the causal relation, between the input and the output of a system (process), is unknown, the causal relation can be quantified.

Especially, in the manufacturing process of the $O_2$ sensor which is a ceramic gas sensor, the sensor output characteristic can be always adjusted within the range of the standard. As a result, the occurrence of defective $O_2$ sensors can be prevented, and quality of $O_2$ sensors can be improved.

According to the conventional method in which the result of inspection obtained in the characteristic inspecting step is fed back to the characteristic adjusting step each time, since other steps exist between the characteristic adjusting step and the characteristic inspecting step, a time delay is necessarily caused in incorporation of the characteristic. However, according to the present embodiment, the product characteristic is predicted by the learning model. Therefore, incorporation of the characteristic can be executed without causing a time delay.

In the present embodiment, in a stage before the learning model is made, the cluster processing is conducted on a set of data for each product lot. Therefore, it is possible to provide effects in which deviation of data distribution is corrected and noise is reduced by the averaging processing. As a result, the accuracy of approximation of the learning model can be enhanced, and the prediction accuracy of the product characteristic can be enhanced. Further, by the data compression effect, a processing time for the learning stage can be reduced.

Since the model making stage is constructed by the neural network, it is possible to estimate the causal relation by appropriately combining a large number of inputs and outputs. Therefore, it is possible to obtain a learning model, in a short period of time, the accuracy of which is high.

Even if a state of a step etc. is changed, it is possible to optimize a learning model by renewing the learning model if necessary, in correspondence with the change. Further, when a new learning model is made, it is compared with the past learning models, and the learning model, the predicted error of which is smallest, is determined to be a learning model to be adopted hereinafter. Therefore, incorporation of the product characteristic can be more preferably executed.

In this connection, the present invention is not limited to the above specific embodiment. It is possible to execute the present invention by the following embodiment.

A learning model may be made by the sensitivity analysis method. In this case, the sensitivity analysis method is defined as a method in which analysis is made as follows. When one of the input values is changed with respect to an output value, how the output value is changed is analyzed. The procedure of the sensitivity analysis method will be described as follows. All values, except for the input values, which need to be changed with respect to the learning model concerned, are fixed, and the input values are swept from the minimum to the maximum and a change in the output is displayed on a graph. It is preferable to sweep pieces of input information such as an aging temperature, a heat treatment furnace to be used and a concentration of additive. While consideration is given to the change degree of the sensor output characteristic when input information is changed, input information used as an input parameter is selected, and the learning model is made by using the thus selected input information. In this case, when input information less affecting the final characteristic is eliminated and input information more affecting the final characteristic is selectively used, the accuracy of the learning model can be enhanced.

In the above embodiment, the learning model is made by using all intermediate characteristics respectively obtained in steps 1 to 5 shown in FIG. 1, however, the learning model may be made by using a portion of the intermediate characteristics. For example, the learning model may be made by using only the intermediate characteristics (plated layer thickness, coated layer thickness and coating weight) respectively obtained in steps 3 to 5 in FIG. 1.

Through, in the above embodiment, one of the requirements is to conduct the cluster processing on a set of data for each product lot, the above manufacturing process may be realized without conducting the cluster processing. That is, the above manufacturing process may be realized as follows. In the simulation personal computer 23, each set of data, which has been read out from the process control data base 22, is used as it is, and a learning model is made which expresses a causal relation when the intermediate characteristics and the processing condition for controlling the characteristic are inputted and the product characteristic is outputted. Compared with the conventional method, in this case, incorporation of the product characteristic can be relatively easily realized, and the accuracy of incorporation of the product characteristic can be enhanced.

The present invention is not limited to the process of manufacturing the $O_2$ sensor. It is possible to apply the present invention to the process of manufacturing other gas sensors such as an A/F sensor, Nox sensor and so forth. Further, it is possible to apply the present invention to a process of manufacturing other products such as a sensor except for a gas sensor, a piezoelectric actuator and a monolithic product such as a ceramic catalyst etc. Especially, it is preferable to apply the present invention to a process of manufacturing a product, the performance characteristic of which must be kept high in the characteristic inspecting step.

For example, concerning the piezoelectric actuator, in its manufacturing process, the ground particle diameter, the sheet molding density and the firing conditions etc. are determined to be intermediate characteristics, and the polarization condition (impressed voltage, time) is determined to be a processing condition for controlling the characteristic. Further, the elongation the generated force and the Curie temperature, of the piezoelectric actuator after the completion of manufacture, are determined to be the final characteristics. On the other hand, concerning the ceramic catalyst, the particle diameter of kaolin in a raw material etc. are determined to be the intermediate characteristics, and the selection of guide ring for adjusting the diameter thereof before firing is determined to be the processing condition for controlling the characteristic. Further, the diameter of ceramic catalyst after firing is determined to be the final characteristic. A learning model is made which expresses a causal relation when the above intermediate characteristics and the processing condition for controlling the characteristic are inputted and the final characteristic is outputted.

Then, this learning model is appropriately applied. Due to the foregoing, in the manufacturing process of manufacturing a piezoelectric actuator or a ceramic catalyst, the accuracy of incorporating the characteristic can be enhanced, and quality of the completed product can be improved.

What is claimed is:

1. A characteristic adjusting method being included in a process of manufacturing products, a characteristic adjusting step for imparting a processing condition for controlling a characteristic being provided in a large number of manufacturing steps, the process of manufacturing products further having a characteristic inspecting step, via at least an another step, after the characteristic adjusting step, the characteristic adjusting method in the process of manufacturing products comprising:

a data preparing stage for preparing a set of data for each product lot composed of
intermediate characteristics obtained in each step before the characteristic adjusting step,
a processing condition for controlling a characteristic imparted in the characteristic adjusting step, and
a product characteristic in a characteristic inspecting step obtained on the basis of the intermediate characteristics and the processing condition for controlling a characteristic, at each moment;

a model making stage for making a learning model expressing a causal relation when the intermediate characteristics and the processing condition for controlling a characteristic are inputted and the product characteristic is outputted by using the set of data prepared in the data preparing stage; and a model applying stage for retrieving the most appropriate processing condition for controlling a characteristic by using the intermediate characteristics in the previous steps before the characteristic adjusting step and the learning model made before, when the characteristic adjusting step is executed.

2. A characteristic adjusting method in a process of manufacturing products according to claim 1, wherein, in the model applying stage, product characteristics are predicted by changing the processing conditions for controlling a characteristic, on the assumption that the intermediate characteristics obtained in steps before the characteristic adjusting step and a processing condition for controlling a characteristic, which is predicted to create small error in a product characteristic, is retrieved.

3. A characteristic adjusting method in a process of manufacturing products according to claim 1, wherein each set of data is plotted in a multi-dimensional space by the parameters of the intermediate characteristics and the processing condition for controlling a characteristic for each set of data prepared in the data preparing stage, each set of data is classified into a plurality of clusters, a new representative point is calculated from an average of data of the same cluster, and a learning model is made by using the calculated representative point in the model making stage.

4. A characteristic adjusting method in a process of manufacturing products according to claim 3, wherein a maximum distance between any two data of each set of data plotted in the multi-dimensional space is calculated, and the cluster processing is conducted in the range of X% of the maximum distance.

5. A characteristic adjusting method in a process of manufacturing products according to claim 1, wherein the model making stage is constructed by a neural network.

6. A characteristic adjusting method in a process of manufacturing products according to claim 1, wherein when a predetermined number of sets of data are accumulated in the usual manufacturing process, the learning model is renewed at a point in time in the data preparing stage and in the model making stage.

7. A characteristic adjusting method in a process of manufacturing products according to claim 1, wherein, when a new learning model is made, the newest learning model and the learning model, which has already been adopted at least at the present time, are compared with each other, and the learning model, which is predicted to create smallest error in a product characteristic, is determined to be a learning model to be adopted thereafter.

8. A characteristic adjusting method in a process of manufacturing products according to claim 1: wherein the characteristic adjusting method is applied to a process of manufacturing a ceramic gas sensor for detecting a specific component concentration in gas to be detected, and in the manufacturing process, a solid electrolyte layer, an electrode layer and a protective layer of the ceramic gas sensor element are made in each step, a heat treatment condition is set as the processing condition for controlling a characteristic in the characteristic adjusting step after that, and an output characteristic of the sensor element is inspected in the characteristic inspecting step; and wherein in the model applying stage, the heat treatment condition is changed on the assumption of the intermediate characteristics obtained in the steps before the characteristic adjusting step so as to retrieve a heat treatment condition for obtaining a desired sensor output characteristic.

* * * * *